United States Patent [19]
Weinstein

[11] 3,747,234
[45] July 24, 1973

[54] EDUCATIONAL APPARATUS
[76] Inventor: Harold Weinstein, 1820 Avenue V, Brooklyn, N.Y. 11229
[22] Filed: Oct. 16, 1972
[21] Appl. No.: 297,616

[52] U.S. Cl. .................................. 35/35 D, 35/9 R
[51] Int. Cl. ............................................. G09b 1/06
[58] Field of Search ................ 35/35 R, 35 D, 35 H, 35/9 R, 9 D, 30, 32, 73; 273/153 R, 22 R

[56] References Cited
UNITED STATES PATENTS

| 521,360 | 6/1894 | Bechmann | 35/73 X |
|---|---|---|---|
| 2,467,781 | 4/1949 | Ribbe | 35/22 R |
| 2,505,230 | 4/1950 | Composto | 35/35 D |
| 2,866,275 | 12/1958 | Reynolds | 35/9 R |
| 3,006,082 | 10/1961 | Libbey | 35/30 |

FOREIGN PATENTS OR APPLICATIONS

| 6,963 | 1895 | Great Britain | 273/153 R |
|---|---|---|---|

Primary Examiner—Wm. H. Grier
Attorney—Allen D. Brufsky

[57] ABSTRACT

Educational apparatus including a receptacle having an open area defined by opposed parallel edges along a dimension thereof. An educational problem card is mounted on the receptacle over the open area. The card includes indicia defining an educational problem and a plurality of individual indicum, a combination of selected ones of which form a composite, correct answer to the educational problem. Openings are associated with each individual indicum on the card. The openings associated with the correct indicum are smaller than those associated with those which are incorrect. A student selects a combination of indicum as the answer to the problem posed by disposing a marker, such as a marble, in the opening associated with the indicum selected as a portion of the composite answer. If the indicum selected is correct, the marble remains seated in the opening, otherwise, it falls through the opening into the receptacle where it runs down an inclined ramp into a collection box for reuse.

7 Claims, 3 Drawing Figures

PATENTED JUL 24 1973    3,747,234
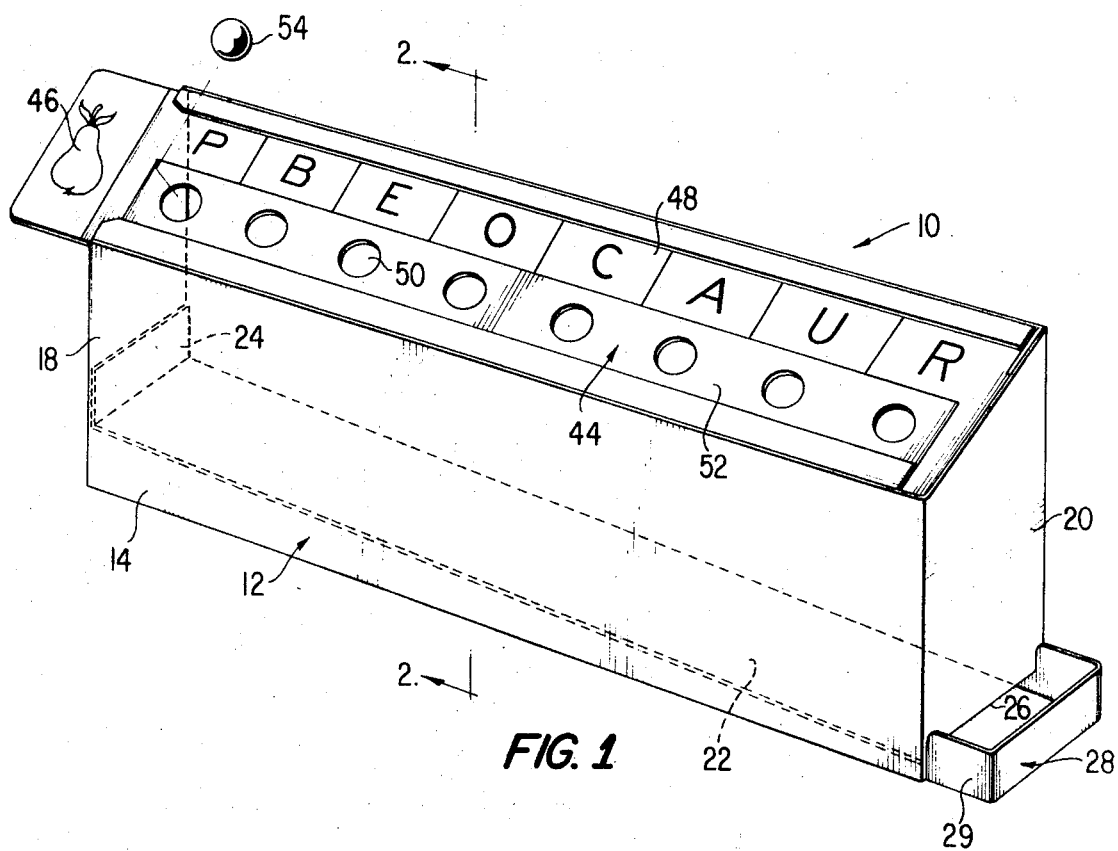
FIG. 1
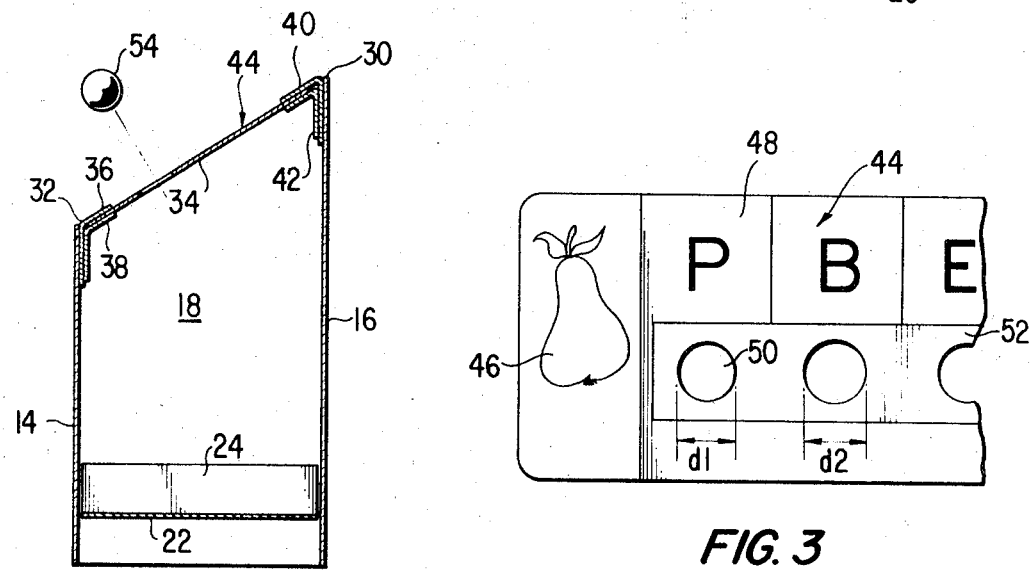
FIG. 2
FIG. 3

3,747,234

EDUCATIONAL APPARATUS

BACKGROUND AND SUMMARY OF THE INVENTION

This invention relates to an educational apparatus in the form of a game, and more particularly to an educational apparatus for improving spelling and language skills, although not limited thereto.

The apparatus is primarily intended for use by preschoolers or young school children who need improvement of their language skills and spelling and utilizes the technique of pictorial association of objects with the correct spelling and visual representation of the name of the object.

This is accomplished by providing a problem card containing indicia in the form of a pictorial representation of a familiar object. Also imprinted on the card is a series of indicum. The student attempts to spell the name of the object pictorially represented by selecting those indicum on the card which when taken together will spell the name of the object.

Associated with each indicum on the card is a hole which receives a marker, such as a marble. The holes associated with the correct indicum are smaller than those associated with incorrect indicum. The card is mounted on a receptacle which has an open area defined by opposed parallel edges. When the marker or marble is placed in a hole associated with a correct selection of an indicum forming a part of the name of the article pictorially represented, it will be seated in the hole. If the selection is incorrect, the marble will fall through the larger opening in the card associated with the incorrect indicum into the receptacle.

The interior of the receptacle is provided with an inclined ramp in communication with a collection box integral with the receptacle where marbles which fall through the card can be collected for reuse by the student. In order to disguise the correct holes in the card, the holes are surrounded by an opaque area, such as a black border which will make all the holes appear to be approximately the same size.

BRIEF DESCRIPTION OF THE DRAWING

Further objects and advantages of the instant invention will become apparent from the following specification and claims and from the accompanying drawing, wherein:

FIG. 1 is a perspective view of the educational apparatus of the present invention;

FIG. 2 is a cross-sectional view taken substantially along the plane indicated by line 2—2 of FIG. 1, and FIG. 3 is a fragmentary top plan view of a portion of the problem card used with the apparatus.

DESCRIPTION OF THE PREFERRED EMBODIMENT

Referring now to the drawing in detail wherein like numerals indicate like elements throughout the several views, the educational apparatus comprising the instant invention is indicated by the numeral 10.

Apparatus 10 includes a receptacle 12 having front and rear walls 14 and 16, respectively, connected by a pair of sidewalls 18 and 20. While the walls of the receptacle are preferably formed from sheet metal, plastic or wood is an acceptable alternative.

The bottom of receptacle 12 is closed by an inclined ramp 22 which is attached to side wall 18 by a flange 24 and slopes from side wall 18 towards sidewall 20.

As shown in FIG. 1, sidewall 20, although parallel to sidewall 18, is shorter so that inclined ramp 22 projects beneath the bottom edge 26 of sidewall 20 and beyond the upright plane of sidewall 20 to form the bottom surface of a collection box 28, which performs a function which will be described in further detail hereinafter. Collection box 28, in addition to a portion of inclined ramp 22, consists of a piece of sheet material bent into a U-shape in plan and is integrally attached, by welding or the like, to front and rear walls 14 and 16.

Rear wall 16 is of greater height than front wall 14 of receptacle 12 and opposed parallel edges 30 and 32 thereof define an inclined open area 34 therebetween extending the entire width of the receptacle. Attached to edge 32 of front wall 14 are a pair of spaced flanges 36, 38, while attached to edge 30 of rear wall 16 are a pair of spaced flanges 40, 42. The space between flanges 36, 38 and flanges 40, 42 define a slideway and support for receiving a problem card 44 used with the apparatus.

Problem card 44 is provided with an indicum 46 which pictorially represents a familiar object. In the example shown, this object is a pear.

The remaining portion of problem card 44 has a series of individual indicum 48 arranged in tandem along the width of the card. As shown in FIGS. 1 and 3, the indicum 48 are individual letters of the alphabet arranged in what would first appear to be an indiscriminate and random order. However, four of the indicum 48, namely the letters P, E, A, and R if properly marked will when taken together spell the name of the object pictorially represented by indicum 46. The student using the apparatus must do just that, namely, pick out and mark those indicum 48 which will spell the name of the object pictorially represented by indicum 48.

Associated with each indicum 48 is a hole 50 punched in problem card 44. As illustrated in FIG. 3, those holes 50 associated with those indicum 48, which if picked and marked by the student will spell the work "PEAR," are of slightly smaller diameter than those holes 50 associated with incorrect indicum 48. In FIG. 3, specifically, the dimension $d_1$ is smaller than $d_2$. In order to disguise the slight variance in the dimension of holes 50, they are surrounded by an opaque area or border 52 on card 44, such as a black painted area. Alternatively, other disguises may be employed, such as radiating lines extending from the circumference of the holes 50.

A plurality of marking devices, such as marbles 54, are funished to the student for use in picking those indicum 48 which will spell the name of the object pictorially represented by indicum 46. A marble 54 is positioned in the hole 50 associated with each indicum 48 which the student believes forms a part of the name of the object. If the indicum 48 selected is correct marble 54 will seat in its hole 50. If incorrect, the marble 54 will fall through the larger incorrect hole 50 and roll down inclined ramp 22 into collection box 28 where it will be available for reuse by the student.

It will be apparent from the foregoing description that the apparatus will force the student to learn the correct spelling and name of the object pictorially represented by indicum 46, as the apparatus is self-correcting in that the student must eventually place the marbles 54 in those holes 50 which they do not fall through. While the apparatus has been described as a spelling aid, it should also be apparent that other problems could be pictorially represented by indicum 46. For example, in teaching foreign languages, the English word could be written at indicum 46 and the foreign word equivalent is to be picked out of indicia 48. Arithmetic problems and answers could also be taught in a similar manner.

I claim:

1. Educational apparatus comprising
a receptacle having opposite edges defining an open area along a dimension thereof,
a problem card having indicia thereon defining an educational problem mounted on said receptacle over said open area, said problem card having a plurality of choices of indicum, some of which if selected in combination form a composite correct answer to the educational problem defined by the indicia appearing on said card,
an opening in said problem card associated with each of said answer forming indicum on said problem card, the dimension of said openings associated with the indicum on said card constituting a portion of the correct composite answer to the educational problem defined by the indicia on said card being smaller than the openings associated with the indicum on said card which do not constitute a portion of the correct composite answer, and
a plurality of markers adapted to be seated over said openings by a student to select a combination of indicum to form the composite answer to said problem on said card, the dimension of said markers being such as to seat on the openings associated with correct indicum selections, but of a dimension to fall through those openings associated with incorrect indicum into said receptacle.

2. Educational apparatus in accordance with claim 1 including
means for collecting said markers which fall into said receptacle.

3. Educational apparatus in accordance with claim 2 wherein said collection means includes
an inclined ramp within said receptacle and
a marker collection box attached to said receptacle in communication with said inclined ramp through a wall of said receptacle.

4. Educational apparatus in accordance with claim 1 wherein
the area surrounding each of the openings in said problem card is opaque to disguise the difference in dimensions of said openings.

5. Educational apparatus in accordance with claim 1 wherein said receptacle includes
a slideway adjacent said opposite edges of said receptacle defining said open area for snugly receiving and positioning said problem card over said open area.

6. Educational apparatus in accordance with claim 5 wherein
the area surrounding each of the openings in said problem card is opaque to disguise the difference in dimensions of said openings.

7. Educational apparatus in accordance with claim 6 including
means for collecting said markers which fall into said receptacle, said means including
an inclined ramp within said receptacle and
a marker collection box attached to said receptacle in communication with said inclined ramp through a wall of said receptacle.

* * * * *